United States Patent
Movahed et al.

(10) Patent No.: US 9,301,361 B1
(45) Date of Patent: Mar. 29, 2016

(54) DIMMING INTERFACE MODULE

(71) Applicants: Kayvon Movahed, Decatur, GA (US);
Chun Wah Chan, Lakeland, TN (US)

(72) Inventors: Kayvon Movahed, Decatur, GA (US);
Chun Wah Chan, Lakeland, TN (US)

(73) Assignee: Cooper Technologies Company,
Houston, TX (US)

( * ) Notice: Subject to any disclaimer, the term of this patent is extended or adjusted under 35 U.S.C. 154(b) by 0 days.

(21) Appl. No.: 14/533,428

(22) Filed: Nov. 5, 2014

(51) Int. Cl.
*G05F 1/00* (2006.01)
*H05B 33/08* (2006.01)

(52) U.S. Cl.
CPC ........ *H05B 33/0845* (2013.01); *H05B 33/0815* (2013.01)

(58) Field of Classification Search
CPC .................................................. H05B 33/08
USPC ......... 315/291, 307, 246, 247, 294, 295, 297, 315/308
See application file for complete search history.

(56) References Cited

U.S. PATENT DOCUMENTS

| | | | |
|---|---|---|---|
| 2010/0225239 A1* | 9/2010 | King | 315/224 |
| 2012/0286689 A1* | 11/2012 | Newman et al. | 315/246 |
| 2013/0069561 A1* | 3/2013 | Melanson et al. | 315/297 |
| 2014/0191683 A1* | 7/2014 | Gaines et al. | 315/294 |
| 2014/0210371 A1* | 7/2014 | Keith et al. | 315/287 |

\* cited by examiner

*Primary Examiner* — Minh D A
(74) *Attorney, Agent, or Firm* — King & Spalding LLP

(57) ABSTRACT

A lighting system is disclosed herein. The lighting system can include at least two power switches that receive power from a power source, and a power supply. The lighting system can include at least one light-emitting diode (LED) light source electrically coupled to the power supply. The lighting system can further include a dimming interface module electrically coupled to the power supply and to the at least two power switches, where the dimming interface module generates a dimming control level within a range of dimming control levels, where the dimming control level corresponds to a position of each power switch of the at least two power switches. The dimming control level can be used by the power supply to generate a dimming signal, where the dimming signal is sent by the power supply to the at least one LED light source.

20 Claims, 2 Drawing Sheets

DIMMING INTERFACE MODULE

TECHNICAL FIELD

Embodiments of the invention relate generally to luminaires, and more particularly to systems, methods, and devices for dimming interface modules for lighting.

BACKGROUND

Existing light fixtures, such as fluorescent light fixtures, often have multiple switches. The multiple switches are used to achieve a kind of dimming with the existing fixture in lieu of a dimming switch. When these existing fixtures are replaced or retrofitted, the work often includes rewiring to replace the multiple switches to accommodate a different dimming capability (e.g., a dimming switch) with the new lighting technology being used with the new light fixture.

SUMMARY

In general, in one aspect, the disclosure relates to a lighting system. The lighting system can include at least two power switches that receive power from a power source, and a power supply. The lighting system can also include at least one light-emitting diode (LED) light source electrically coupled to the power supply. The lighting system can further include a dimming interface module electrically coupled to the power supply and to the at least two power switches, where the dimming interface module generates a dimming control level within a range of dimming control levels, where the dimming control level corresponds to a position of each power switch of the at least two power switches. The dimming control level can be used by the power supply to generate a dimming signal, where the dimming signal is sent by the power supply to the at least one LED light source.

In another aspect, the disclosure can generally relate to a dimming interface module for a lighting device. The dimming interface module can include at least two power input terminals that are configured to receive input power from at least two power switches, where each of the at least two power switches has an open position and a closed position. The dimming interface module can also include a power output terminal that is configured to send output voltage to a power supply when any of the at least two power switches is in a closed position. The dimming interface module can further include at least one dimming output terminal configured to generate a dimming control level for the power supply of the lighting device, where the dimming control level is within a range of dimming control levels, and where the dimming control level is based on a position of each of the at least two power switches. The dimming control level can be used by the power supply to generate a dimming signal, where the dimming signal is sent by the power supply to at least one LED light source.

In yet another aspect, the disclosure can generally relate to a luminaire. The luminaire can include a housing and a power supply disposed within the housing. The luminaire can also include at least one light-emitting diode (LED) light source electrically coupled to the power supply and coupled to the housing. The luminaire can further include a dimming interface module electrically coupled to the power supply and to at least two power switches external to the housing, where the dimming interface module generates a dimming control level within a range of dimming control levels, where the dimming control level corresponds to a position of each power switch of the at least two power switches. The dimming control level can be used by the power supply to generate a dimming signal, where the dimming signal is sent by the power supply to the at least one LED light source.

These and other aspects, objects, features, and embodiments will be apparent from the following description and the appended claims.

BRIEF DESCRIPTION OF THE DRAWINGS

The drawings illustrate only example embodiments of dimming interface modules and are therefore not to be considered limiting of its scope, as dimming interface modules may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
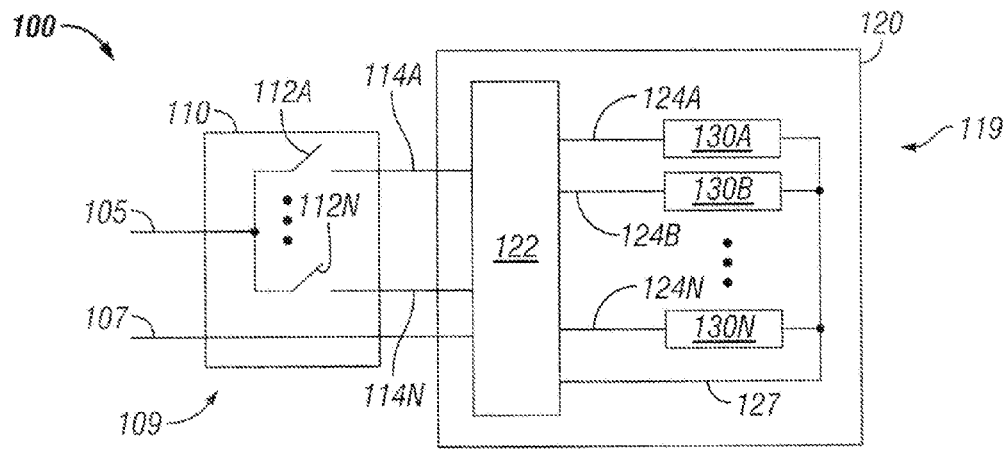
FIG. 1 shows a diagram of a lighting system using multi-switch dimming currently used in the art.

The example embodiments discussed herein are directed to systems, apparatuses, and methods of dimming interface modules. While the example dimming interface modules described herein are directed toward retrofitting or replacing an existing light source that uses fluorescent lighting technology, light sources of example dimming interface modules are not limited to fluorescent technology. Examples of other lighting technologies of existing fixtures that can be used with example dimming interface modules can include, but are not limited to, incandescent, halogen, and sodium vapor.

Any luminaire with example dimming interface modules, or portions (e.g., components) thereof, described herein can be located in a single housing. Alternatively, various components (e.g., an example dimming interface module (or portions thereof)) can be located in multiple housings and/or in different locations relative to each other.

As described herein, a user can be any person that interacts with example dimming interface modules or lighting systems that use dimming interface modules. Examples of a user may include, but are not limited to, an engineer, an electrician, a maintenance technician, an instrumentation and controls technician, a mechanic, an operator, a consultant, a contractor, a plant manager, a homeowner, and a manufacturer's representative.

As defined herein, an electrical conductor is one or more electrical conductors that can carry electrical power (e.g., current, voltage). The electrical conductors can be made from one or more of a number of electrically conductive materials, including but not limited to copper and aluminum. The size of each electrical conductor is suitable to carry the amount of power required by the components to which the electrical conductor is electrically coupled. Each conductor of an electrical conductor can be encased by an electrically non-conductive material, including but not limited to rubber and nylon. An electrical cable can include one or more electrical conductors.

The example dimming interface modules described herein can be placed in outdoor environments. In addition, or in the alternative, example dimming interface modules can be subject to extreme heat, extreme cold, moisture, humidity, high winds, dust, chemical corrosion, and other conditions that can cause wear on lighting systems, example dimming interface modules, or portions thereof. In certain example embodiments, the dimming interface modules, including any portions thereof, are made of materials that are designed to maintain a long-term useful life and to perform when required without electrical or mechanical failure.

Example dimming interface modules can comply with one or more standards for one or more environments of use, where such standards are established and maintained by one or more authoritative entities, including but not limited to Underwriters Laboratories (UL), the Institute for Electrical and Electronics Engineers (IEEE), the National Electromechanical Manufacturers Association (NEMA), and the International Electrotechnical Commission (IEC).

Example embodiments of dimming interface modules will be described more fully hereinafter with reference to the accompanying drawings, in which example embodiments of dimming interface modules are shown. Dimming interface modules may, however, be embodied in many different forms and should not be construed as limited to the example embodiments set forth herein. Rather, these example embodiments are provided so that this disclosure will be thorough and complete, and will fully convey the scope of dimming interface modules to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation. Also, the names given to various components described herein are descriptive of one embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

For any figures described herein, example embodiments (or details thereof) are shown. For each figure, one or more of the components may be omitted, added, repeated, and/or substituted. Accordingly, embodiments captured in such figure should not be considered limited to the specific arrangements of components shown in that figure. In addition, any component described in a figure herein can apply to a corresponding component having a similar label in another figure herein. In other words, the description for any component of one figure can be considered substantially the same as the corresponding component described with respect to another figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in another figure have the identical last two digits.

FIG. 1 shows a diagram of a lighting system 100 using multi-switch dimming currently used in the art. Referring to FIG. 1, the lighting system 100 can include a switch assembly 109 and a light fixture 119. The switch assembly 109 can include multiple power switches 112 (e.g., power switch 112A, power switch 112N). The light fixture 119 can include a power supply 122 and at least three light sources 130 (e.g., light source 130A, light source 130B, light source 130N) disposed within or connected to a housing 120.

The switch assembly 109 can include an enclosure 110 (e.g., a wall box) inside of which the multiple power switches 112 are located. Each power switch 112 can receive power from a power source (not shown), such as a breaker, a battery, and another switch. All of the power switches 112 in the switch assembly 109 are electrically coupled in parallel to each other. As shown in FIG. 1, the power switches 112 can receive the power from the power source through an electrical conductor 105. One of the power switches 112 (e.g., power switch 112A) can have the same, or different, characteristics (e.g., size, shape, configuration) compared to the characteristics of one or more of the other power switches 112. Each power switch 112 in the switch assembly 109 can be operated by a user independently of the other power switches 112 in the switch assembly 109.

In certain embodiments, each power switch 112 is a bipole switch (e.g., an on-and-off switch). In such a case, each power switch 112 can have an open state (as shown in FIG. 1) and a closed state. In the open state (corresponding to an "off" position), the power received from the power source through the electrical conductor 105 is prevented by the power switch 112 from flowing through the power switch 112. Alternatively, in the closed state (corresponding to an "on" position), the power switch 112 creates a path across which the power received from the power source can flow.

The power supply 122 of the light fixture 119 is electrically coupled to the power switches 112 of the switch assembly 109. Specifically, an electrical conductor 114 can electrically couple each power switch 112 to the power supply 122. For example, electrical conductor 114A can electrically couple power switch 112A to the power supply 122. As another example, electrical conductor 114N can electrically couple power switch 112N to the power supply 122. In this way, when a power switch 112 is closed, power from the power source can flow through the power switch 112 and the associated electrical conductor 114 to the power supply 122 of the light fixture 119.

The power supply 122 can also be electrically coupled to electrical conductor 107. In certain embodiments, the electrical conductor 107 is a neutral line for alternating current (AC) power used by the lighting system 100. In such a case, the power flowing through from the power source to the power switches 112 can be, for example, 120 VAC or 277 VAC. The electrical conductor 107 and the electrical conductor 105 can be part of the same electrical cable. In such a case, as shown in FIG. 1, a portion of the electrical conductor 107 can be disposed in the enclosure 110 of the switch assembly 109 without terminating at any point within the switch assembly 109. Alternatively, the electrical conductor 107 and the electrical conductor 105 can be separate electrical conductors not of the same electrical cable, such that the electrical conductor 107 is not run through the enclosure 110 of the switch assembly 109.

The power supply 122 can be called any of a number of other names, including but not limited to a ballast. The power supply 122 regulates the power (e.g., current) received by the light sources 130. The power supply 122 can regulate the power received by the light sources 130 in one or more ways.

For example, the power supply 122 can manipulate (e.g., transform, invert, convert) the power received from the power switches 112 through the electrical conductors 114 so that the power delivered to the light sources 130 is of a level and type that is used by the light sources 130.

As another example, the power supply 122 can deliver power to one or more certain light sources 130 (and, simultaneously, not deliver power to one or more certain other light sources 130) based on which power switches 112 are closed and which power switches 112 are open. In this way, the position (e.g., open, closed) of the various power switches 112 dictates how many of the light sources 130 are illuminated, which effectively adjusts, in a step-wise manner, the light output of the lighting system 100. In other words, the various power switches 112 act like a dimmer that adjusts the light output of the lighting system 100 in a step-wise manner (in discrete increments).

The power regulated by the power supply 122 and delivered to the light sources 130 is sent using a number of electrical conductors 124 (e.g., electrical conductor 124A, electrical conductor 124B, electrical conductor 124N). One end of each electrical conductor 124 is coupled to the power supply 122, and the other end of each electrical conductor 124 is coupled to one of the light sources 130 (e.g., light source 130A, light source 130B, light source 130N). At the end of each light source 130, opposite from where the electrical conductor 124 is coupled, another electrical conductor 127 provides the return coupling to the power supply 122. In other words, one end of the electrical conductor 127 is coupled to the power supply 122, and the other end of the electrical conductor 127 is coupled to each of the light sources 130. The electrical conductor 127 completes a circuit between the power supply 122 and each of the light sources 130.

The following Table 1 provides a summary of the various amount of light output by the light fixture 119 when the switch assembly 109 of the lighting system 100 has two power switches 112.

TABLE 1

| Power Switch 112A Position | Power Switch 112B Position | % of Total Light Output of Lighting System |
|---|---|---|
| Open | Open | 0% |
| Closed | Open | 33% |
| Open | Closed | 66% |
| Closed | Closed | 100% |

Existing lighting systems, like the lighting system 100 of FIG. 1, are not very efficient compared to lighting systems that use other lighting technologies. For example, when the light sources 130 are fluorescent bulbs, a number of other lighting technologies (e.g., LED) are more efficient in terms of energy consumption and light quality. At times, a user will replace or retrofit an existing, less efficient/effective lighting system with a lighting system that uses newer and/or more efficient light sources. As an example, FIG. 2 shows a lighting system 200 using adjustable multi-switch dimming in accordance with certain example embodiments.

Figure 2:
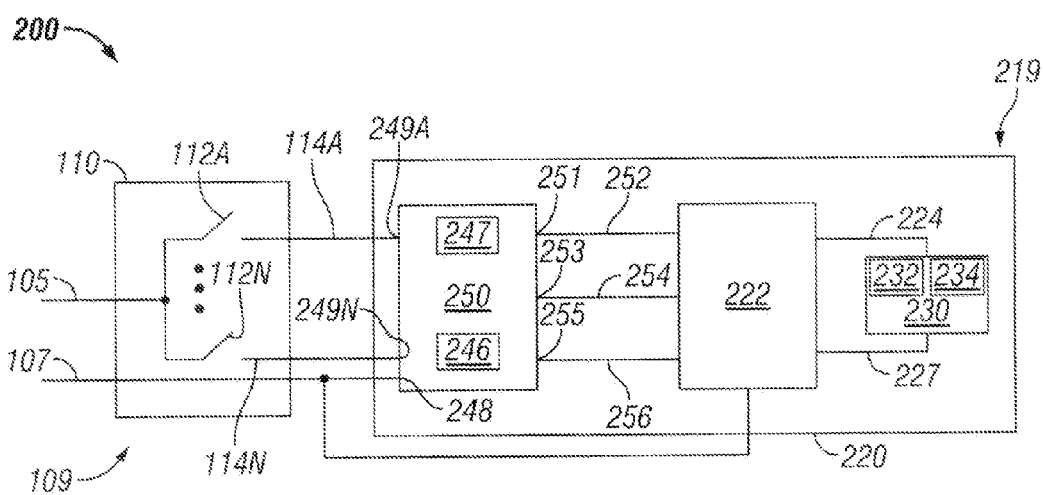
FIG. 2 shows a lighting system using adjustable multi-switch dimming in accordance with certain example embodiments.

In this case, the lighting system 200 of FIG. 2 uses the switch assembly 109 of the lighting system of FIG. 1. Since the switch assembly 109 is located remotely from the light fixture 119 of the lighting system 100, replacing the switch assembly 109 and, in some cases, the electrical conductors 114, can be costly in terms of labor and material. However, dimming capabilities are often desired with lighting systems, and power supplies (such as power supply 222 of the lighting fixture 219 of the lighting system 200 of FIG. 2) of replacement/retrofit light fixtures can operate with a traditional dimming switch (e.g., a sliding switch, a rotatable knob), but not with a step-wise, discrete increment dimmer like the power switches 112 of FIG. 1.

In order to avoid the time and expense of replacing the power switches 112 and retrofitting the switch assembly 109, an example dimming interface module 250 can be used. For example, as shown in FIG. 2, the new/retrofit light fixture 219 can include an example dimming interface module 250. In this case, the example dimming interface module 250 is disposed within a housing 220 of the light fixture 219. Alternatively, the example dimming interface module 250 can be located remotely from the housing 220 but coupled to the power supply 222.

The example dimming interface module 250 can be coupled to the output of the power switches 112 of the switch assembly 109. In this case, the electrical conductors 114 of FIG. 1 are reused, along with the switch assembly 109, for the lighting system 200 of FIG. 2. Specifically, each electrical conductor 114 is coupled to an input terminal 249 (e.g., input terminal 249A, input terminal 249N) of the dimming interface module 250. Electrical conductor 107 can also be coupled to a neutral terminal 248 of the dimming interface module 250. In certain example embodiments, the electrical conductor 107 can further be coupled to the power supply 222.

In certain example embodiments, the dimming interface module 250 receives, at the input terminals 249, input power from the one or more of the power switches 112 using a respective electrical conductor 114. Once the input power is received from the one or more of the power switches 112, the dimming interface module 250 can process the input power, if any, received through each electrical conductors 114 and determine an amount of dimming that a user desires. In other words, the dimming interface module 250 can determine, based on the input power received at the various input terminals 249, which of the power switches 112 are open and which of the power switches 112 are closed.

In certain example embodiments, the dimming interface module 250 includes at least one control switch 247 that is adjustable by a user. The control switch 247 can be any type of adjustment mechanism that allows a user to further control (adjust) a dimming level of the light fixture 219. Examples of a control switch 247 can include, but are not limited to, a dial, a potentiometer, a slidebar, a dipole switch, and a multi-pole switch. A selection for a control switch 247 can be a setting on a physical device, or a setting on a graphical user interface. The setting of each control switch 247 can be a number, a word (e.g., low, medium, high), a phrase (e.g., "low light"), or any other suitable designation that a user can select to adjust the dimming capability of the dimming interface module 250.

Without the control switch 247, the light output of the light fixture 219 could vary based on the position of the power switches 112 in the same way that the light output of the light fixture 119 varies based on the position of the power switches 112. In other words, without a control switch 247, the position of the power switches 112 affect the amount of light emitted by the light fixture 219 of FIG. 2 in substantially the same way that the position of the power switches 112 affect the amount of light emitted by the light fixture 119 of FIG. 1.

With the one or more optional control switches 247, the amount of light emitted by the light fixture 219 for a given configuration of the power switches 112 can be adjusted by a user. For example, referring to Table 1, when there are two power switches 112, the following Table 2 provides a summary of the various amounts of light output by the light fixture 219 based on the position of the power switches 112 and on the setting of the control switch 247. In this case, the selected setting of the control switch 247 is "low light".

TABLE 2

| Power Switch 112A Position | Power Switch 112B Position | Setting of Control Switch 247 | % of Total Light Output of Lighting System |
|---|---|---|---|
| Open | Open | Low Light | 0% |
| Closed | Open | Low Light | 10% |
| Open | Closed | Low Light | 20% |
| Closed | Closed | Low Light | 30% |

Alternatively, one or more control switches can alter the dimming when less than all of the power switches 112 are in the closed position. An example of this is shown in Table 3 below, where the control switch 247 (which, as stated above, can include more than one switch) is set for low dim/high dim.

TABLE 3

| Power Switch 112A Position | Power Switch 112B Position | Setting of Control Switch 247 | % of Total Light Output of Lighting System |
|---|---|---|---|
| Open | Open | Low Dim/High Dim | 0% |
| Closed | Open | Low Dim/High Dim | 20% |
| Open | Closed | Low Dim/High Dim | 80% |
| Closed | Closed | Low Dim/High Dim | 100% |

In certain example embodiments, the dimming interface module 250 also includes a power output terminal 255. The power output terminal 255 is coupled to one end of an electrical conductor 256, the other end of which is coupled to the power supply 222. The power output terminal 255 sends output power to the power supply 222 through the electrical conductor 256. The dimming interface module 250 is configured such that the power output terminal 255 sends a power signal to the power supply 222 when any of the power switches 112 is closed. In other words, the power output terminal 255 sends a power signal to the power supply 222 when any of the input terminals 249 receives power.

The output power sent by the power output terminal 255 through the electrical conductor 256 to the power supply 222 can be of the same amount and type (e.g., 277 VAC) as the power received by one or more of the input terminals 249. Alternatively, the dimming interface module 250 can manipulate (e.g., transform, invert, convert) the power received by the input terminals 249 so that the output power is of a different amount and/or type as the power received by the input terminals 249.

In certain example embodiments, the dimming interface module 250 includes at least one dimming output terminal (in this case, dimming output terminal 251 and dimming output terminal 253). The dimming output terminals 251, 253 are coupled to the power supply 222. Specifically, in this case, dimming output terminal 251 is coupled to the power supply 222 using electrical conductor 252, and dimming output terminal 253 is coupled to the power supply 222 using electrical conductor 254.

The dimming output terminals 251, 253 are used to communicate a dimming control level, using the electrical conductors 252, 254 (respectively), to the power supply 222. The dimming control level is within a range of dimming control levels and can be based on the position of each of the power switches 112. The dimming control level can have one or more of a number of forms. For example, the dimming control level can be a resistance. As another example, the dimming control level can be a voltage.

The range of dimming control levels can be based on and can be defined by the minimum dimming control level and the maximum dimming control level accepted by the power supply 222. For example, if the dimming control level is a voltage, the range of dimming control levels can be 0-10V direct current (DC), where 0 VDC is the minimum dimming control level and 10 VDC is the maximum dimming control level.

In certain example embodiments, when the diming control level is a voltage, the dimming interface module 250 regulates the dimming control level received by the power supply 222. The dimming interface module 250 can regulate the dimming control level generated for the power supply 222 in one or more ways. For example, the dimming interface module 250 can manipulate (e.g., transform, invert, convert) the input power received from the power switches 112 through the electrical conductors 114 so that the dimming control level generated for the power supply 222 is of a level and type that is used by the power supply 222. Similarly, when the diming control level is a resistance, the dimming control level generated by the dimming interface module 250 is within a range of resistance levels that is used by the power supply 222 to generate a dimming signal.

In such a case, the dimming interface module 250 can include one or more components that generate the dimming control level from the input power. For example, if the input power is AC power and the dimming control level is a voltage (e.g., DC power), then the dimming interface module 250 can include one or more power converters. This allows, for example, the dimming interface module 250 to receive input power of 277 VAC or 120 VAC and generate a dimming control level with a range between and inclusive of 0 VDC and 10 VDC. As another example, when the dimming control level is a resistance, the dimming interface module 250 can receive input power of 277 VAC or 120 VAC and generate a dimming control level with a range between and inclusive of 0 Ohms and 100 kOhms.

In any case, the dimming interface module 250 can generate and deliver (or otherwise make available) the dimming control level to the power supply 222 based on which power switches 112 are closed and which power switches 112 are open. In this way, the position (e.g., open, closed) of the various power switches 112 dictates, at least in part, the dimming control level generated by the dimming interface module 250. Thus, the various power switches 112, in conjunction with the optional control switch 247, set the dimming level of the light engine assemblies 230.

The power supply 222 of the light fixture 219 of FIG. 2 can be substantially the same as the power supply 122 of the light fixture 119 of FIG. 1, except as described below. In this case, the power supply 222 can be called any of a number of other names, including but not limited to a driver, a LED driver, and a power driver. The power supply 222 regulates the power (e.g., current) received by the light engine assemblies 230. The power supply 222 can regulate the power received by the light engine assemblies 230 in one or more ways. For example, the power supply 222 can manipulate (e.g., transform, invert, convert) or otherwise use the dimming control level received from the dimming interface module 250 through the electrical conductors 252, 254 so that the power (the dimming signals) delivered to the light engine assemblies 230 is of a level and type that is used by the light engine assemblies 230.

The dimming control level received by the power supply 222 and the resulting power (dimming signal) generated by the power supply 222 and delivered to the light engine assemblies 230 is sent using one or more electrical conductors 224. One end of the electrical conductor 224 is coupled to the power supply 222, and the other end of the electrical conductor 224 is coupled to one or more light engine assemblies 230. Also coupled to the one or more light engine assemblies 230 is electrical conductor 227, which is also coupled to the power supply 222. In other words, one end of the electrical conductor 227 is coupled to the power supply 222, and the other end of the electrical conductor 227 is coupled to each of the light engine assemblies 230. The electrical conductor 227 completes a circuit between the power supply 222 and each of the light engine assemblies 230.

The one or more light engine assemblies 230 can include a circuit board 232 and at least one light source 234. The circuit board 232 can be a medium that includes, and on which are disposed, one or more of a number of discrete components (e.g., a capacitor, a power terminal, a resistor, a light source 271) and/or one or more integrated circuits that are interconnected with each other by a number of wire traces embedded in the circuit board 232. The circuit board 232 can be called one or more of a number of other names, including but not limited to a board, a wiring board, a printed wiring board, and a printed circuit board.

A light source 234 can use any of a number of different types of lighting technologies, including but not limited to LED, incandescent, halogen, fluorescent, and sodium vapor. In certain example embodiments, the light source 234 uses LED technology. In such a case, the light source can be any type of LED, including but not limited to chip-on-board, discrete, and array. Further, a light source 234 can emit one or more of a number of colors (e.g., white, red, green, blue) in one or more of a number of modes (e.g., constant, flashing, intermittent, color transitions). For example, the light source 234 can be a tricolor LED that is capable of emitting red light, green light, blue light, and/or light with any combination thereof. In certain example embodiments, a control module (not shown, but could be located remotely with respect to the light fixture 219 or as part of the power supply 222) can be operatively coupled to one or more of the light engine assemblies 230 and control the operation mode of one or more light sources 234.

In certain example embodiments, the dimming interface module 250 includes an optional communication device 246. In such a case, the communication device 246 can be operatively coupled to the control switch 247. The communication device 246 can send signals to and/or receive signals from a user. Signals sent to a user can, for example, confirm receipt of an instruction, report a position of the control switch 247 (which corresponds to the dimming level of the light sources 234), and report a problem with the light fixture 219. Signals received from a user can, for example, adjust the position of the control switch 247 and request the status of a component of the light fixture 219. The communication device 246 can use wired and/or wireless technology.

Figure 3:
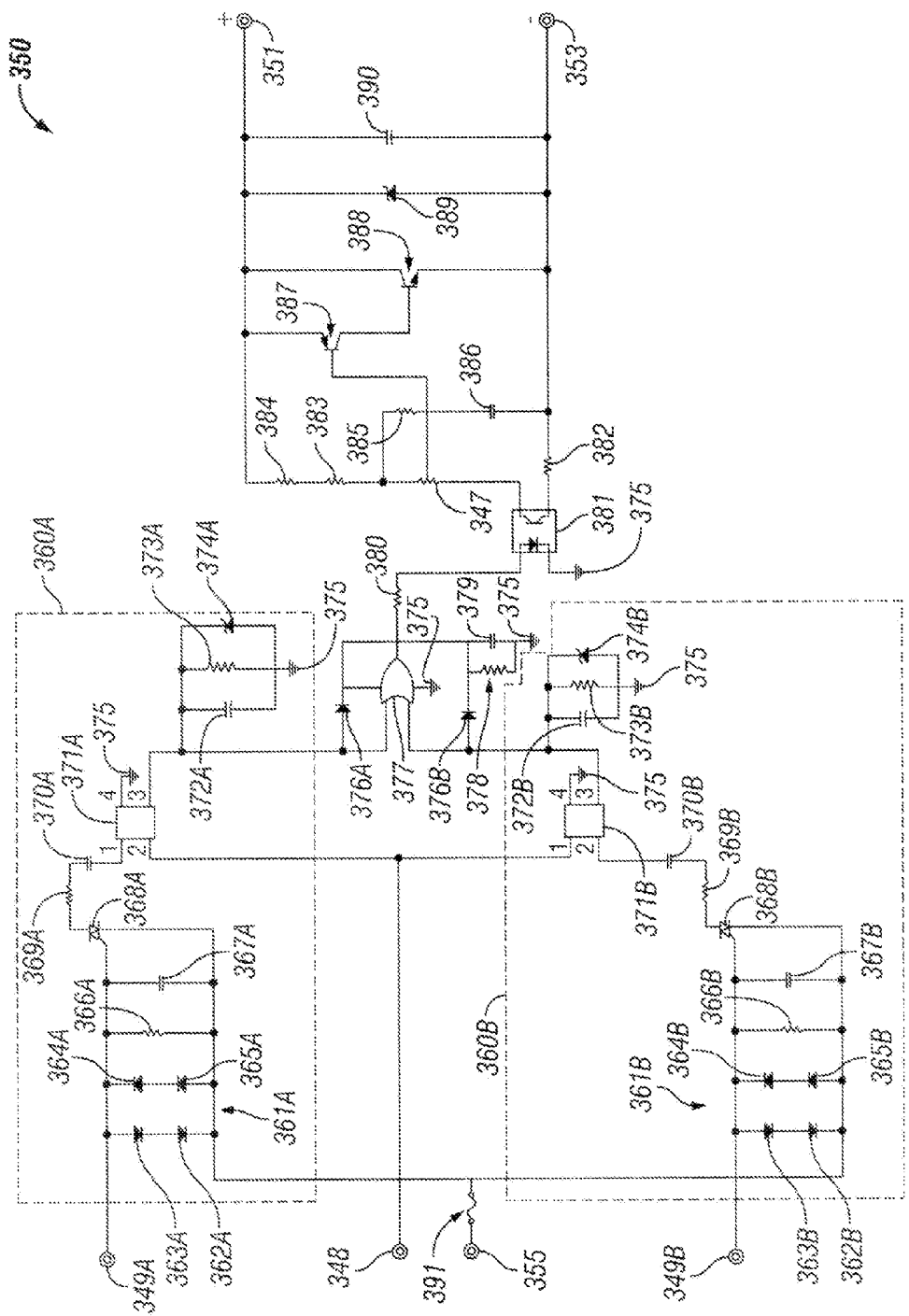
FIG. 3 shows a schematic diagram of a dimming interface module in accordance with certain example embodiments.

The dimming interface module (e.g., dimming interface module 250), including any components or modules (e.g., power manipulation module 360A) thereof, can include one or more discrete components (e.g., resistors, capacitors, diodes) and/or integrated circuits. In other words, the dimming interface module can include hardware and/or software. An example of a dimming interface module 350 is shown in FIG. 3. Referring to FIGS. 1-3, the dimming interface module 350 in FIG. 3 has two input terminals 349 (input terminal 349A and input terminal 349B) that receive input power from the power switches 112.

Coupled to each input terminal 349 in this case is a power manipulation device 360. Specifically, power manipulation module 360A is coupled to (receives the input power from) input terminal 349A, and power manipulation module 360B is coupled to (receives the input power from) input terminal 349B. For example, each of power manipulation module 360A and power manipulation module 360B includes a converter that can convert AC power (when the input power is, for example, 277 VAC) to DC power (when the dimming control level is a voltage that is, for example, 0-10 VDC, inclusive). As another example, as in this case, each of power manipulation module 360A and power manipulation module 360B includes components that converts the AC power received from the power switches 112 to a resistance that represents the dimming control level, where the resistance is between 0 Ohms and 1 MOhm, inclusive.

The configuration of one of the power manipulation modules (e.g., power manipulation module 360A) of the dimming interface module 350 can be substantially the same as, or different than, the configuration of one or more of the other power manipulation modules (e.g., power manipulation module 360B). In this example, the configuration of power manipulation module 360A is substantially the same as the configuration of power manipulation module 360B. Specifically, each power manipulation module 360 of FIG. 3 includes a number of diodes (diode 362, diode 363, diode 364, and diode 365 that form a bridge 361, as well as diode 374), resistors (resistor 366, resistor 369, resistor 373), capacitors (capacitor 367, capacitor 370, capacitor 372), a triac 368, and a bridge rectifier 371 that are electrically coupled to each other, directly or indirectly, in parallel and/or in series, with an electrical ground 375.

The neutral terminal 348 of the dimming interface module 350 is coupled to the electrically neutral portion of the circuit. Also, the power output terminal 355 sends a power signal to a power supply (e.g., power supply 222 of the light fixture 219) when any of the input terminals 349 receives power. The dimming interface module 350 can also include a protection device 391 (e.g., a fuse) to help protect portions of the lighting system during a fault condition.

The dimming interface module 350 of FIG. 3 also includes a number of diodes (diode 376, diode 389), a number of resistors (resistor 378, resistor 380, resistor 382, resistor 383, resistor 384, resistor 385), a number of capacitors (capacitor 379, capacitor 386, capacitor 390), a number of transistors (transistor 387, transistor 388), an exclusive-OR gate 377, an optocoupler 381, and a control switch 347 that are electrically coupled to each other, directly or indirectly, in parallel and/or in series, with an electrical ground 375. Dimming output terminal 351 and dimming output terminal 353 receive the output of this portion of the circuit, which generates the dimming control level.

The systems and methods described herein allow a light fixture of an existing lighting system that have two or more power switches in lieu of a traditional dimming switch to be replaced (retrofit) without replacing the power switches or corresponding wiring. Example embodiments thus allow for reduced manufacturing time, fewer materials (e.g., no traditional dimming switch, no new wiring), reduced labor to retrofit/install a light fixture, and reduced costs of luminaires. Example embodiments also provide for increased performance because a control switch can allow adjustments by a user, manually or electronically, with respect to the dimming capability of the new light fixture.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A lighting system, comprising:
    at least two power switches that receive power from a power source, wherein each power switch of the at least two power switches is a bipole switch that is manually set by a user;
    a power supply;
    at least one light-emitting diode (LED) light source electrically coupled to the power supply; and
    a dimming interface module electrically coupled to the power supply and to the at least two power switches, wherein the dimming interface module generates a dimming control level within a range of dimming control levels, wherein the dimming control level corresponds to a position of each power switch of the at least two power switches,
    wherein the at least two power switches are remotely located from the dimming interface module, wherein the dimming control level is used by the power supply to generate a dimming signal, wherein the dimming signal is sent by the power supply to the at least one LED light source.

2. The lighting system of claim 1, wherein the position of each power switch of the at least two power switches is one selected from a group consisting of an open position and a closed position.

3. The lighting system of claim 2, wherein the dimming interface module delivers a power signal to the power supply when any of the at least two switches is in the closed position.

4. The lighting system of claim 1, wherein the at least two power switches are part of an existing lighting system, and wherein the power supply, the at least one LED light source, and the dimming interface module are part of a retrofit fixture that replace an existing power supply and a plurality of existing light sources of the existing lighting system.

5. The lighting system of claim 1, wherein the dimming control level is a resistance.

6. The lighting system of claim 1, wherein the dimming control level is a voltage, wherein the range of dimming control levels is substantially similar to a range of dimming voltage inputs accepted by the power supply.

7. The lighting system of claim 6, wherein the dimming interface module comprises at least one power manipulation module that converts alternating current (AC) power to the direct current (DC) power.

8. The lighting system of claim 7, wherein the range of dimming control levels is between and inclusive of zero volts and 10 volts DC.

9. The lighting system of claim 1, wherein the dimming interface module comprises at least one control switch, wherein the at least one control switch adjusts the dimming control level for the position of each power switch of the at least two power switches.

10. The lighting system of claim 9, wherein the at least one control switch is a physical switch that can be set by a user.

11. The lighting system of claim 9, wherein the dimming interface module further comprises a communication device, wherein the at least one control switch can be electronically adjusted by a user using the communication device.

12. The lighting system of claim 1, wherein the power delivered by the power source is alternating current (AC) power.

13. The dimming interface module of claim 1, further comprising:
    at least one control switch adjustable by a user, wherein the dimming control level is further based on a position of the at least one control switch.

14. The dimming interface module of claim 13, wherein the at least one control switch comprises a potentiometer.

15. A dimming interface module for a lighting device, the dimming interface module comprising:
    at least two power input terminals that are configured to receive input power from at least two power switches, wherein each of the at least two power switches comprise an open position and a closed position, and wherein each of the at least two power switches is a bipole switch that is manually set by a user;
    a power output terminal that is configured to send output voltage to a power supply when any of the at least two power switches is in a closed position; and
    at least one dimming output terminal configured to generate a dimming control level for the power supply of the lighting device, wherein the dimming control level is within a range of dimming control levels, and wherein the dimming control level is based on a position of each of the at least two power switches,
    wherein the at least two power switches are remotely located from the dimming interface module, wherein the dimming control level is used by the power supply to generate a dimming signal, wherein the dimming signal is sent by the power supply to at least one LED light source.

16. The dimming interface module of claim 15, further comprising:
    a communication device that adjusts the at least one control switch based on an instruction signal received from a user.

17. The dimming interface module of claim 15, further comprising:
    at least one power manipulation module that converts the input power to the dimming control level, wherein the dimming control level is a direct current voltage, wherein the input power is alternating current, and wherein each power input terminal of the at least two power input terminals is coupled to a power manipulation module of the at least one power manipulation module.

18. The dimming interface module of claim 15, further comprising:
    at least one power manipulation module that converts the input power to the dimming control level, wherein the dimming control level is a resistance, and wherein each power input terminal of the at least two power input terminals is coupled to a power manipulation module of the at least one power manipulation module.

19. A luminaire comprising:
    a housing;
    a power supply disposed within the housing;

at least one light-emitting diode (LED) light source electrically coupled to the power supply and coupled to the housing; and a dimming interface module disposed within the housing and electrically coupled to the power supply and to at least two power switches, wherein the at least two power switches are bipole switches that are located external to the housing and that are set manually by a user, wherein the dimming interface module generates a dimming control level within a range of dimming control levels, wherein the dimming control level corresponds to a position of each power switch of the at least two power switches, wherein the dimming control level is used by the power supply to generate a dimming signal, wherein the dimming signal is sent by the power supply to the at least one LED light source.

20. The luminaire of claim 19, wherein the position of each power switch of the at least two power switches is one selected from a group consisting of an open position and a closed position, and wherein the at least two power switches are disposed, at least in part, in an electrical enclosure comprising a separate housing.

\* \* \* \* \*